Patented Jan. 12, 1954

2,666,071

UNITED STATES PATENT OFFICE 2,666,071

11α-HYDROXY-17α-PROGESTERONE AND ESTERS THEREOF

Herbert C. Murray, Hickory Corners, and Durey H. Peterson, Kalamazoo, Mich., assignors to The Upjohn Company, Kalamazoo, Mich., a corporation of Michigan No Drawing. Application July 1, 1952, Serial No. 296,736

12 Claims. (Cl. 260—397.4)

1

This invention relates to new and useful steroids and more specifically to 11α-hydroxy-17α-progesterone and 11α-acyloxy-17α-progesterones and to methods for the preparation thereof.

It is an object of this invention to provide the novel 11α-hydroxy-17α-progesterone, otherwise identified as 11α-hydroxy-17-isoprogesterone, and 11α-acyloxy-17α-progesterones, otherwise identified as 11α-acyloxy-17-isoprogesterones, new and useful compositions of matter having pharmacological and especially progestational activity and being additionally useful in the synthesis of various oxygenated steroids. Another object is to provide a process for the preparation of these compounds. Other objects of the invention will be apparent to those skilled in the art to which this invention pertains.

The novel compounds of the present invention are represented by the following structural formula:

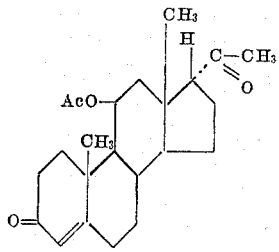

wherein Ac is hydrogen or an acyl group of a carboxylic acid.

These compounds are useful as intermediates in the synthesis of pharmacologically active steroids. For example, on reacting an alcoholic solution of 11α-acyloxy-17α-progesterone with concentrated hydrochloric acid, the known pharmacologically active steroid, 11α-hydroxyprogesterone is obtained. Oxidation of 11α-hydroxy-17α-progesterone by chromic acid followed by mutorotation with alkali produces the physiologically active 11-ketoprogesterone.

In addition, the 11α-hydroxy-17α-progesterone and 11α-acyloxy-17α-progesterones exhibit anesthetic and inhibitory properties in glucocorticoid, estrogenic, folliculoid, testoid, spermatogenic, renotropic, hypertensive, salt retention, luteoid and progesterone activities.

Using the procedure set forth in the following examples, the 11α-acyloxy-17α-progesterones are prepared by reacting 11α-hydroxy-17α-progesterone with ketene, ketenes of selected acids, selected acids, and anhydrides or acid chlorides in an organic solvent such as pyridine or the like, or an inert solvent, including solvents like benzene, toluene, ether, and the like, for example, and heated at a temperature between about zero degrees centigrade and the boiling point of the reaction mixture, usually about room temperature, for a period between about a half hour and about 96 hours. The time of reaction is somewhat dependent upon the temperature at which the reaction is carried out, the acylating agent, and the ratio of reactants. The reaction mixture is quenched with ice or cold water, and the product is collected in an organic solvent which is thereafter washed with successive portions of a mildly basic solution and water to obtain a solution of the product which is essentially neutral. In some instances, the product may crystallize from the reaction mixture, in which case it may be advantageous to separate the product by filtration or other means, wash with water, and thereafter purify by conventional means, such as, for example, by recrystallization from a suitable solvent or chromatographic purification, as deemed necessary.

The starting material in these acylation reactions, 11α-hydroxy-17α-progesterone, may be prepared by subjecting 16-dehydroprogesterone to the action of a fungus of the order Mucorales as set forth in the applications of Murray and Peterson, Serial Number 180,496, filed August 19, 1950, now abandoned, and Serial Number 272,944, filed February 23, 1952, issued on July 8, 1952 as United States Patent 2,602,769, of which this application is a continuation-in-part, and Serial Number 296,723, filed July 1, 1952.

The following preparations and examples are illustrative of the objects, processes and products of the present invention, but are not to be construed as limiting.

*Example 1.—11α-hydroxy-17α-progesterone*

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Two liters of this sterilized medium was inoculated with *Rhizopus nigricans* ATCC 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of *Rhizopus nigricans* minus strain was added one gram of 16-dehydroprogesterone in 25 milliliters of acetone to provide a suspension of the steroid in the culture. After an additional 24 hour period of incubation under the same conditions of temperature and aeration, the beer containing mycelium was extracted twice with one liter portions of methylene chloride and twice with 500-milliliter portions of methylene chloride. The extract was washed twice with 250 milliliters of five percent sodium bicarbonate and twice with 250 milliliters of water. After drying over anhydrous sodium sulfate, filtering and evaporating the solvent, a semicrystalline residue of 2.045 grams was obtained. This residue was dissolved in fifty milliliters of benzene and chromatographed over 100 grams of alumina (hydrochloric acid washed and activated by heating at 120 degrees centigrade for four hours). Developing solvents were added to the column in 180-milliliter portions as given in Table I.

Table I

| Fraction | Solvent | Eluate Solids, Milligrams |
| --- | --- | --- |
| 1, 2 | benzene | 166.0 |
| 3, 4 | benzene plus 20 percent ether | 140.5 |
| 5, 6 | benzene plus 50 percent ether | 9.0 |
| 7, 8 | ether | 10.0 |
| 9, 10 | ether plus 5 percent chloroform | 23.0 |
| 11, 12 | ether plus 10 percent chloroform | 33.5 |
| 13, 14 | ether plus 50 percent chloroform | 85.0 |
| 15–17 | chloroform | 658.0 |
| 18, 19 | chloroform plus 10 percent acetone | 113.0 |
| 20, 21 | chloroform plus 50 percent acetone | 72.5 |
| 22, 23 | acetone | 61.0 |
| 24 | methanol | 106.0 |

Fractions 5 through 13, inclusive, were combined and recrystallized from two milliliters of acetone to give fifty milligrams of starting material, melting point 184 to 189 degrees centigrade. Fractions 14 through 17, inclusive, were combined and dissolved in 0.5 milliliter of methylene chloride. To this solution, five milliliters of ether was added to cause crystallization at room temperature. Crystallization was completed by cooling the solution to zero degrees centigrade for two hours. The yellow supernatant liquid was decanted from the crystals which were then washed with five milliliters of ether to which a few drops of acetone was added. The product was recrystallized from one milliliter of methylene chloride to which ether was added until crystallization was effected. After two recrystallizations from methylene chloride with the addition of ether, 255 milligrams were obtained of colorless crystals of 11α-hydroxy-17α-progesterone, melting point 209 to 211.5 degrees centigrade, $[\alpha]_D^{23}$ of minus twelve degrees (0.995 in chloroform). Structure was confirmed by infrared and ultraviolet spectra.

Analysis: Calculated for $C_{21}H_{30}O_3$: C, 76.32; H, 9.15. Found: C, 76.07; H, 9.07.

*Example 2.—11α-acetoxy-17α-progesterone*

A 48.5 milligram sample of 11α-hydroxy-17α-progesterone was dissolved in two milliliters of pyridine, mixed with one milliliter of acetic anhydride and maintained at room temperature over night, whereupon the solution was diluted with cold water and extracted three times with twenty milliliter portions of ether. The ether extracts were washed successively with five percent hydrochloric acid, water, five percent sodium hydroxide, and water again. Upon drying over sodium sulfate and concentrating, 53 milligrams of an oil was obtained which was dissolved in aqueous methanol and refrigerated at minus ten degrees centigrade whereupon the 11α-acetoxy-17α-progesterone crystallized, having a melting point of 132 to 133 degrees centigrade and an optical rotation $[\alpha]_D^{27}$ of minus 27 degrees. The structure was verified by infrared spectrum.

*Example 3.—11α-dimethylacetoxy-17α-progesterone*

In the same manner as given in Example 2, using the equivalent proportion of dimethylacetic anhydride in place of acetic anhydride produced 11α-dimethylacetoxy-17α-progesterone.

*Example 4.—11α-(β-cyclopentylpropionyloxy)-17α-progesterone*

In the same manner as given in Example 2, using the equivalent proportion of β-cyclopentylpropionyl chloride in place of acetic anhydride produced 11α-(β-cyclopentylpropionyloxy)-17α-progesterone.

*Example 5.—11α-benzoxy-17α-progesterone*

In the same manner as given in Example 2, using the equivalent proportion of benzoyl chloride in place of acetic anhydride produced 11α-benzoxy-17α-progesterone.

*Example 6.—11α-trimethylacetoxy-17α-progesterone*

In the same manner as given in Example 2, using the equivalent proportion of trimethylacetic anhydride in place of acetic anhydride produced 11α-trimethylacetoxy-17α-progesterone.

In a similar manner, other 11α-acyloxy esters of 11α-hydroxy-17α-progesterone are prepared by reacting 11α-hydroxy-17α-progesterone with the selected acid anhydride in pyridine or with other acylating agents and solvents as previously described in this specification. Representative 11α-esters of 11α-hydroxy-17α-progesterone thus-prepared include, especially, one to eight carbon atom carboxylic acid acyloxy esters of saturated or unsaturated aliphatic or cycloaliphatic, carbocyclic, aryl, arylalkyl, alkaryl, mono-, di- or polycarboxylic acids, which form ester groups such as, for example, formyloxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoyloxy, naphthoyloxy, cyclopentylformyloxy, acrylyloxy, cyclohexylformyloxy, β-cyclopentylpropionyloxy, the half and di-esters of malonic, maleic, succinic, glutaric, adipic acids, and the like. The acids may also contain non-interfering substituents, such as mono- or poly-halo, chloro, bromo, hydroxy, methoxy, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of 11α-hydroxy-17α-progesterone and 11α-acyloxy-17α-progesterone wherein acyloxy is a hydrocarbon-carbonyloxy radical containing less than nine carbon atoms.

2. 11α-hydroxy-17α-progesterone.

3. 11α-acyloxy-17α-progesterone wherein acyloxy is a hydrocarbon-carbonyloxy radical containing less than nine carbon atoms.

4. 11α-acetoxy-17α-progesterone.
5. 11α-dimethylacetoxy-17α-progesterone.
6. 11α(β-cyclopentylpropionyloxy)-17α-progesterone.
7. 11α-trimethylacetoxy-17α-progesterone.
8. A process for the production of 11α-acyloxy-17α-progesterone which comprises reacting 11α-hydroxy-17α-progesterone with an acylating agent to form 11α-acyloxy-17α-progesterone.
9. A process for the production of 11α-acyloxy-17α-progesterone which comprises reacting 11α-hydroxy-17α-progesterone with a carboxylic acid to form 11α-acyloxy-17α-progesterone.
10. A process for the production of 11α-acyloxy-17α-progesterone which comprises reacting 11α-hydroxy-17α-progesterone with a carboxylic acid anhydride to form 11α-acyloxy-17α-progesterone.
11. A process for the production of 11α-acyloxy-17α-progesterone which comprises reacting 11α-hydroxy-17α-progesterone with a carboxylic acid halide to form 11α-acyloxy-17α-progesterone.
12. A process for the production of 11α-acetoxy-17α-progesterone which comprises reacting 11α-hydroxy-17α-progesterone with acetic anhydride to form 11α-acetoxy-17α-progesterone.

HERBERT C. MURRAY.
DUREY H. PETERSON.

References Cited in the file of this patent

Fieser et al., Natural Products Related to Phenanthrene, 3rd ed., p. 408 (1949).